(12) United States Patent
Zhang et al.

(10) Patent No.: US 12,050,990 B2
(45) Date of Patent: Jul. 30, 2024

(54) DEVICE AND METHOD FOR TRAINING AN AUGMENTED DISCRIMINATOR

(71) Applicant: Robert Bosch GmbH, Stuttgart (DE)

(72) Inventors: Dan Zhang, Leonberg (DE); Anna Khoreva, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 859 days.

(21) Appl. No.: 15/734,129

(22) PCT Filed: Aug. 13, 2019

(86) PCT No.: PCT/EP2019/071694
§ 371 (c)(1),
(2) Date: Dec. 1, 2020

(87) PCT Pub. No.: WO2020/057867
PCT Pub. Date: Mar. 26, 2020

(65) Prior Publication Data
US 2021/0216857 A1    Jul. 15, 2021

(30) Foreign Application Priority Data
Sep. 17, 2018  (EP) .................................... 18194791

(51) Int. Cl.
*G06N 3/08*      (2023.01)
*G06N 3/047*     (2023.01)
*G06N 3/048*     (2023.01)

(52) U.S. Cl.
CPC .............. *G06N 3/08* (2013.01); *G06N 3/047* (2023.01); *G06N 3/048* (2023.01)

(58) Field of Classification Search
CPC .......... G06N 3/08; G06N 3/047; G06N 3/048; G06N 20/20; G06N 3/094; G06F 18/24;
(Continued)

(56) References Cited

U.S. PATENT DOCUMENTS 11,373,117 B1 *   6/2022  Cui ....................... G06F 16/285
11,468,314 B1 *  10/2022  Singh .................... G06N 3/048
(Continued)

FOREIGN PATENT DOCUMENTS

CA      2995242 A1 *   8/2019  ............ A41D 27/20
CN    108388795 A   *   8/2018
(Continued)

OTHER PUBLICATIONS

International Search Report for PCT/EP2019/071694, Issued Oct. 18, 2019.
(Continued)

*Primary Examiner* — Steven P Sax
(74) *Attorney, Agent, or Firm* — Norton Rose Fulbright US LLP; Gerard A. Messina

(57) ABSTRACT

A computer-implemented method for training an augmented discriminator and a generator. The method includes: providing a training set comprising real training samples and artificial training samples for training of the augmented discriminator, wherein the artificial training samples are generated by the generator; assigning a data sequence to at least one data sample of the training set; wherein each pair of data sample and assigned data sequence is assigned to one of a plurality of classes such that, given the assigned one class and the assigned data sequence characterize whether the data sample is a real training sample or an artificial training sample; training the augmented discriminator to compute from pairs of data sample and assigned data sequence the respective class to which the corresponding pair is assigned; training the generator to generate artificial training samples such that the augmented discriminator is not able to correctly compute the aforementioned one class.

17 Claims, 15 Drawing Sheets

(58) Field of Classification Search
CPC .............. G06F 18/285; G06F 18/2453; G06F 18/241

See application file for complete search history.

(56) References Cited

U.S. PATENT DOCUMENTS

| | | | | |
|---|---|---|---|---|
| 11,475,276 | B1* | 10/2022 | Shrivastava | ............ G06N 3/094 |
| 2018/0211164 | A1 | 7/2018 | Bazrafkan et al. | |
| 2019/0080206 | A1* | 3/2019 | Hotson | ............... G06F 18/2185 |
| 2019/0132343 | A1* | 5/2019 | Chen | ................... G06N 3/045 |
| 2019/0197358 | A1* | 6/2019 | Madani | ................... G06N 3/045 |
| 2019/0197368 | A1* | 6/2019 | Madani | ................... G16H 30/40 |
| 2019/0333219 | A1* | 10/2019 | Xu | ........................ G06N 3/047 |
| 2020/0027554 | A1* | 1/2020 | Boroczky | .............. G16H 30/40 |
| 2020/0080861 | A1* | 3/2020 | Qiao | ................. G01C 21/3446 |
| 2020/0176117 | A1* | 6/2020 | Lee | ........................ G06F 18/241 |
| 2020/0294201 | A1* | 9/2020 | Planche | .............. G06F 18/2413 |
| 2020/0387798 | A1* | 12/2020 | Hewage | ................... G06N 3/08 |
| 2021/0117733 | A1* | 4/2021 | Mahto | ................. G06F 18/2193 |
| 2024/0028907 | A1* | 1/2024 | Shi | .......................... G06F 18/24 |

FOREIGN PATENT DOCUMENTS

| | | | | |
|---|---|---|---|---|
| CN | 108470187 | A * | 8/2018 | ........... G06K 9/6256 |
| CN | 108550151 | A * | 9/2018 | ................ G06T 5/50 |
| CN | 109086658 | A * | 12/2018 | ......... G06K 9/00335 |
| CN | 108491497 | B * | 6/2020 | ............. G06F 40/00 |
| EP | 4306241 | A1 * | 1/2024 | .............. B22F 10/00 |
| WO | WO-2019127231 | A1 * | 7/2019 | ........... G06K 9/6267 |
| WO | WO-2020003533 | A1 * | 1/2020 | ........... G06K 9/6234 |

OTHER PUBLICATIONS

Goodfellow et al., "Generative Adversarial Networks," Cornell University Library, 2014, pp. 1-9. ARXIV:1406.2661V1.

Radford, Alec, et al., "Unsupervised Representation Learning With Deep Convolutional Generative Adversarial Networks," Cornell University Library, 2016, pp. 1-16. ARXIV:1511.06434V2 Downloaded Nov. 13, 2020.

* cited by examiner

DEVICE AND METHOD FOR TRAINING AN AUGMENTED DISCRIMINATOR

FIELD

The present invention relates to a method and a system for training an augmented discriminator, and a machine-readable storage medium.

BACKGROUND INFORMATION

Generative adversarial networks, or "GAN", are described in "Generative Adversarial Networks", arXiv preprint arXiv: 1406.2661v1, 2014, Goodfellow et al.

SUMMARY

The methods in accordance with example embodiments of the present invention may have the advantage of achieving a more powerful generator of a generative adversarial network, thereby also providing a more powerful discriminator that has been trained in a Generative Adversarial Network.

In machine learning, data is important for training a machine learning system, but at the same time, real data for training may be a scarce resource. Generative modeling can help enrich the data set in various ways, such as synthetic data generation, data augmentation and transfer learning. Since real problems often require to model high-dimensional probability distributions, generative modeling remains as a challenging research problem.

Generative adversarial networks are one of the most successful modeling approaches. The core idea behind GAN is to set up a competing game for two players, commonly known as the discriminator (D) and the generator (G). The generator makes effort on creating samples that shall come from the same distribution as the training data. On contrary, the discriminator aims at telling them apart.

Mathematically, the objective of D and G may be formulated as a min-max problem:

$$\min_G \max_D E_{P_{data}}\{\log \sigma[D(x)]\} + E_{P_G}\{\log \sigma[-D(x)]\}, \quad (1)$$

where $\sigma[\cdot]$ stands for the sigmoid-function that maps the real-valued function $D(x)$ to the unit interval $[0,1]$. $P_G$ is the generative distribution governed by the generator G. The discriminator D solves a two-class classification task, where the two classes are respectively associated with $P_{data}$ and $P_G$. The generator G tries to fool D. When the two-player game reaches the Nash equilibrium, it can be shown that the obtained generative distribution $P_G$ must be identical to $P_{data}$.

Considering the tractability issue, it is unrealistic to optimize G and D directly in the function space though this is theoretically optimal. Conveniently, D and G may adopt deep neural networks for parameterizing their functionalities, e.g., DCGAN (see, e.g., "Unsupervised Representation Learning with Deep Convolutional Generative Adversarial Networks", arXiv preprint arXiv:1511.06434v2, 2016, Alec Radford, Luke Metz, Soumith Chintala).

Furthermore, the neural network for G in most cases models a sampler following $P_G$ rather than $P_G$ explicitly. The sampler takes a random noise vector z as its input and applies a transformation G for obtaining a synthetic sample=G (z). The prior distribution $P_z$ of z and G jointly define $P_G$.

Stochastic gradient descent (SGD) methods are commonly applied for solving the min-max problem. The neural network parameters of G and D are alternatively and iteratively updated until convergence or until a certain stopping criterion is met. It is noted that there is no guarantee for either such training process to converge or its convergence to the desired Nash equilibrium. For this reason, the performance of GANs varies over applications and has been shown to be sensitive to training initializations, network architectures and hyper-parameter selections. In short, training GANs is a challenging task.

One root reason for the potential failure of GANs arises from the formulation of the cost function, particularly when combining with SGD methods for optimization. The cost function never saturates when discriminator D is suboptimal. When D maxes out, i.e., when D is well-optimized for a given G and is able to reliably discriminate real samples from synthetic examples generated by G, the gradients for further updating G vanishes. Eventually, the min-max game fails to reach the desired optimum. It is also important to note that the support of $P_{data}$ and $P_G$c, respectively, resides on a low-dimensional manifold. Since the two manifolds are unlikely to be overlapped or perfectly aligned in real problems, it is almost trivial for D to max out. So, during the course of GAN training, a powerful D harms the learning process of G. On the other hand, a weak D by intentionally choosing an over-simplified neural network is unable to provide right feedback for G to learn the ground truth.

For tackling the problem, the related art work typically resorts to cost function reformulation and training process regularization. In the above-mentioned publication by Goodfellow et al. 2014, it has been shown that the inner maximum of the cost function in equation (1) is identified as the Jenson-Shannon divergence (JSD) between $P_{data}$ and $P_G$. It is a similarity measure of two distributions and its minimum equal to zero is attained at $P_{data}=P_G$.

The problem targeted by the present invention is to avoid early saturation of D during the course of GAN training. It therefore provides a novel way to balance the optimization process of G and D.

To illustrate why the example method in accordance with the present invention works, it is convenient to consider the following mathematical consideration. Jensen-Shannon divergence (JSD) is a similarity measure of distribution pairs. GAN aims to optimize $P_G$ such that its JSD w.r.t. $P_{data}$ is minimized. Mathematically, GAN as captured in equation (1) is equivalent to $$\min_G JSD(P_{data}, P_G). \quad (2)$$

Starting from equation (2), the derivation of this invention bases on the following key points:

A binary random variable s with uniform distribution is introduced, which connects the two distributions $P_{data}(x)$ and $P_G(x)$ to a mixture distribution $P(x)$ $$P(x) = \sum_s P(s)P(x|s) \text{ with } P(x|s) = \begin{cases} P_{data}(x) & \text{if } s = 0 \\ P_G(x) & \text{if } s = 1 \end{cases} \quad (3)$$

Namely, $P_{data}(x)$ and $P_G(x)$ are two modes of $P(x)$, whereas s is the mode indicator. Under such construction, the mutual information between x and s equals the JSD of $P_{data}(x)$ and $P_G(x)$ such that $$\min_G JSD(P_{data}(x)P_G(x)) \equiv \min_G I(s, x). \quad (4)$$

The mutual information $I(s,x)$ is a Kullback-Leibler (KL) divergence measure between the joint distribution P (x, s) and the disjoint one $P(x)P(s)$. As the goal in equation (4) is to minimize the mutual information, there is no loss in replacing the KL divergence by the JSD. They are both minimized under the same condition, i.e., $P(x, s)=P(s)P(x)$. Mathematically, this identification leads to the second equivalent problem $$\min_G JSD(P_{data}(x), P_G(x)) \equiv \min_G I(s, x) \equiv \min_G JSD(P(x, s), P(s)P(x)). \quad (5)$$

The disjoint distribution $P(x)P(s)$ can be decomposed as $$P(s)P(x)=0.5P(x,s)+0.5Q(x,s) \quad (6)$$

with $$Q(x|s) = \begin{cases} P_G(x) & \text{if } s = 0 \\ P_{data}(x) & \text{if } s = 1 \end{cases} \text{ and } Q(x, s) = Q(x|s)P(s)$$

where $Q(x, s)$ is an outcome of applying a mode flip on top of $P(x, s)$ as defined in (3). Making $P(x, s)$ and $P(x)P(s)$ identical is essentially to let $P(x, s)$ equal $Q(x, s)$, i.e., $$\min_G JSD(P_{data}(x), P_G(x)) \equiv \min_G I(s, x) \equiv \quad (7)$$
$$\min_G JSD(P(x, s), P(s)P(x)) \equiv \min_G JSD(P(x, s), Q(x, s)).$$

One way to link the first and the last minimization problem in (7) is viewing s as a one bit augmentation to the sample x. One rule based on $P(x, s)$ is to augment samples from $P_{data}(x)$ and $P_G(x)$ respectively with 0 and 1. The other rule derived from $Q(x, s)$ is simply the opposite. In the conventional GAN, JSD between $P_{data}$ and $P_G$ is estimated by the discriminator D through classifying the data and synthetic samples as TRUE and FAKE.

Therefore, in a first aspect of the present invention, it is envisioned to have a computer-implemented method for training an augmented discriminator AD and a generator (G). Augmented discriminator AD needs to distinguish the augmented samples. Therefore, in accordance with an example embodiment of the present invention, the method according to the first aspect of the present invention includes the steps of providing a training set comprising real training samples ($x_d$) and artificial training samples ($x_g$) for training of the augmented discriminator (AD), wherein the artificial training samples ($x_g$) are generated by the generator (G);

assigning a data sequence (s) to at least one data sample (x) of the training set;

wherein each pair (x, s) of data sample (x) and assigned data sequence (s) is assigned to one of a plurality of classes such that, given the assigned one class of the plurality of classes and the assigned data sequence (s) taken together characterize whether the data sample (x) is a real training sample ($x_d$) or an artificial training sample ($x_g$);

and training the augmented discriminator (AD) to being able to compute from pairs (x, s) of data sample (x) and assigned data sequence (s) the respective one class ($r_d$) to which the corresponding pair (x, s) is assigned training the generator (G) to being able to generate artificial training samples ($x_d$) such that the augmented discriminator (AD) is not able to correctly compute the aforementioned one class ($r_d$).

Preferably, the plurality of classes consists of two classes, i.e., it comprises neither more than nor less than two classes Note that one can build the discriminator D to distinguish P(x, s) and Q(x, s), i.e., the last JSD in (7). An alternative solution can be to distinguish P(x, s) and P(s)P(x) as indicated in the second last JSD in (7). Since P(s)P(x) is a mixture of P(x, s) and Q(x, s) in (6), the two contrasting distributions have a guarantee on an overlapped support to alleviate the vanishing gradient issue. This is illustrated in FIGS. 15a)-c).

Shown in FIG. 15a) is an illustration of the joint distribution P (x, s), shown in FIG. 15b) is an illustration of the corresponding mode-flipped joint distribution Q (x, s) for given distributions of artificial training samples $p_q$ and of real training samples pa. If the classes to which $r_d$ may correspond are denoted as TRUE and FALSE, respectively, the distribution shown in FIG. 15a) corresponds to $r_d$=TRUE, whereas the distribution shown in FIG. 15b) corresponds to $r_d$=FALSE. Shown in FIG. 15c)) is an illustration of the arithmetic mean of P(x, s) and Q(x, s).

The distribution shown in FIG. 15c) has two identical modes at s=0 and 1. It is clear to see the overlap of the supports of the distributions shown in FIG. 15a) and the ones shown in FIG. 15c). In order to fool the discriminator, the generator has to optimize G such that the mode at s=1 in the FIG. 15a) horizontally appears at the same place in the same shape as the mode at s=0. Only when this takes place, the distributions shown in FIG. 15c) become identical to the distributions shown in FIG. 15a). That is because when $P^g=P_d$, the curve of $P_g$ moves to the left and be horizontally aligned with Pa and they have the same shape.

When this takes place, the four modes in FIG. 15 c) will reduce to two modes which are the same as FIG. 15a). Then, the two distributions are identical. The augmented discriminator AD will be unable to distinguish samples from P(x, s) and P(x)P(s).

Improvements to the example method are described herein.

Such an augmented discriminator has a number of applications. For example, it may be envisioned to use a trained augmented discriminator for classifying whether an input signal provided to a machine learning system is more similar to the real training examples samples ($x_d$) or to the artificial training samples ($x_g$), i.e., the trained augmented discriminator classifies the input signal depending on whether the input signal is more similar to the real training examples samples ($x_d$) or to the artificial training samples ($x_g$). This may, for example, be used for detecting anomalies in the input data.

Alternatively, the generator trained during training of the augmented discriminator may be used to train a discriminator. Such a discriminator is easier to use than the augmented discriminator.

In another aspect of the present invention, the trained generator may be used to generate training samples, which may then be used to train a machine learning system. This machine learning system may then be used to control an actuator, thus rendering the control more reliable and/or more precise.

Example embodiments of the present invention are discussed with reference to the following figures in more detail.

DETAILED DESCRIPTION OF EXAMPLE EMBODIMENTS

Figure 1:
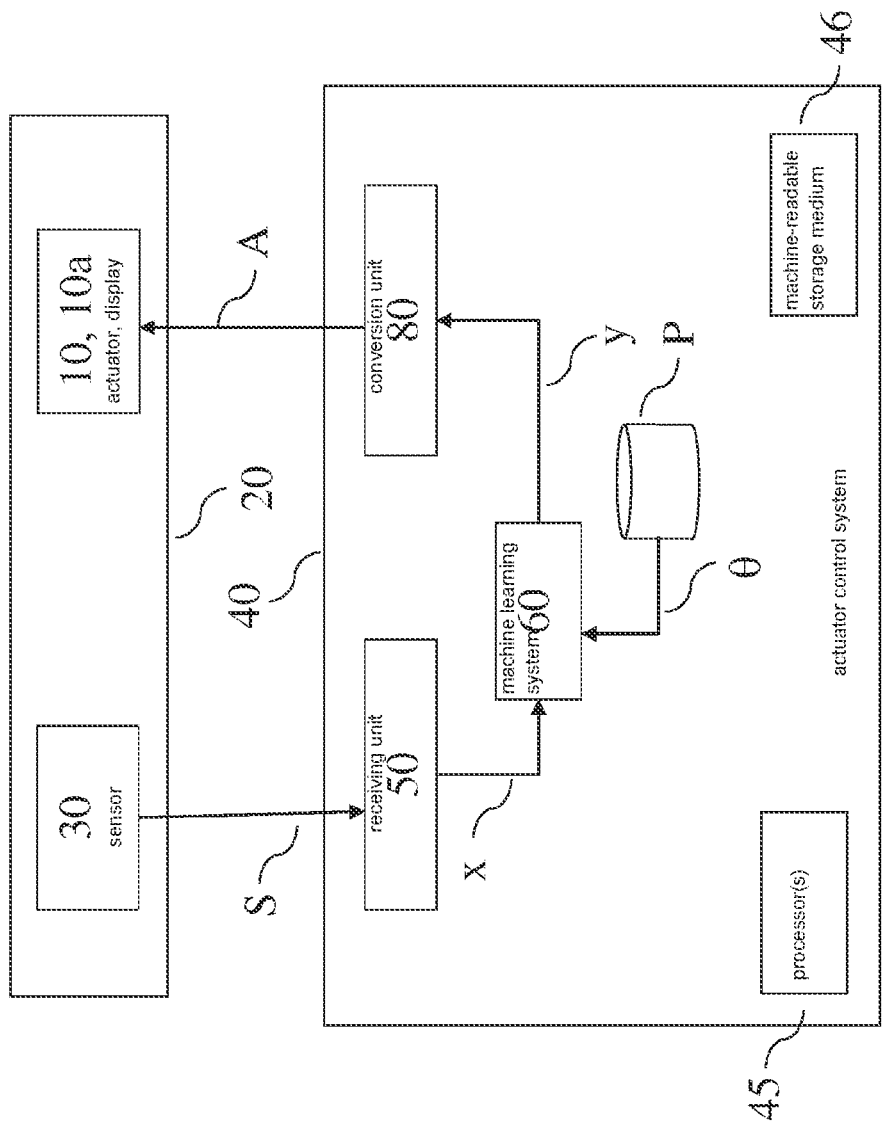
FIG. 1 shows an actuator control system having a machine learning system controlling an actuator in its environment, in accordance with an example embodiment of the present invention.

Shown in FIG. 1 is one embodiment of an actuator 10 in its environment 20. Actuator 10 interacts with an actuator control system 40. Actuator 10 and its environment 20 will be jointly called actuator system. At preferably evenly spaced distances, a sensor 30 senses a condition of the actuator system. The sensor 30 may comprise several sensors. An output signal S of sensor 30 (or, in case the sensor 30 comprises a plurality of sensors, an output signal S for each of the sensors) which encodes the sensed condition is transmitted to the actuator control system 40.

Thereby, actuator control system 40 receives a stream of sensor signals S. It the computes a series of actuator control commands A depending on the stream of sensor signals S, which are then transmitted to actuator 10.

Actuator control system 40 receives the stream of sensor signals S of sensor 30 in an optional receiving unit 50. Receiving unit 50 transforms the sensor signals S into input signals x. Alternatively, in case of no receiving unit 50, each sensor signal S may directly be taken as an input signal x. Input signal x may, for example, be given as an excerpt from sensor signal S. Alternatively, sensor signal S may be processed to yield input signal x. Input signal x may, for example, comprise images, or frames of video recordings. In other words, input signal x is provided in accordance with sensor signal S.

Input signal x is then passed on to a machine learning system 60, which may, for example, be given by an artificial neural network.

Machine learning system 60 is parametrized by parameters θ, which are stored in and provided by parameter storage P.

Machine learning system 60 determines output signals y from input signals x. Output signals y are transmitted to a conversion unit 80, which converts the output signals y into the control commands A. Actuator control commands A are then transmitted to actuator 10 for controlling actuator 10 accordingly.

Actuator 10 receives actuator control commands A, is controlled accordingly and carries out an action corresponding to actuator control commands A. Actuator 10 may comprise a control logic which transforms actuator control command A into a further control command, which is then used to control actuator 10.

In further embodiments, actuator control system 40 may comprise sensor 30. In even further embodiments, actuator control system 40 alternatively or additionally may comprise actuator 10.

Furthermore, actuator control system 40 may comprise a processor 45 (or a plurality of processors) and at least one machine-readable storage medium 46 on which instructions are stored which, if carried out, cause actuator control system 40 to carry out a method according to one aspect of the present invention.

Alternatively or additionally to actuator 10, the embodiment may comprise a display unit 10a which may also be controlled in accordance with actuator control commands A.

In all of the above embodiments, machine learning system 60 may comprise a discriminator that is configured to detect whether input signal x has a predefined property or not. For example, machine learning system 60 may be configured to determine whether input signal x may be trusted for further processing, or not.

Output signal y may be determined depending on whether input signal x has been judged to have a predefined property, or not. For example, output signal y may be chosen to correspond to a regular output signal y in case input signal x has been determined to be trustworthy, and it may incorporate information that cause actuator 10 and/or display unit 10a to be operated in a safe mode in case input signal x has been determined not to be trustworthy.

Figure 2:
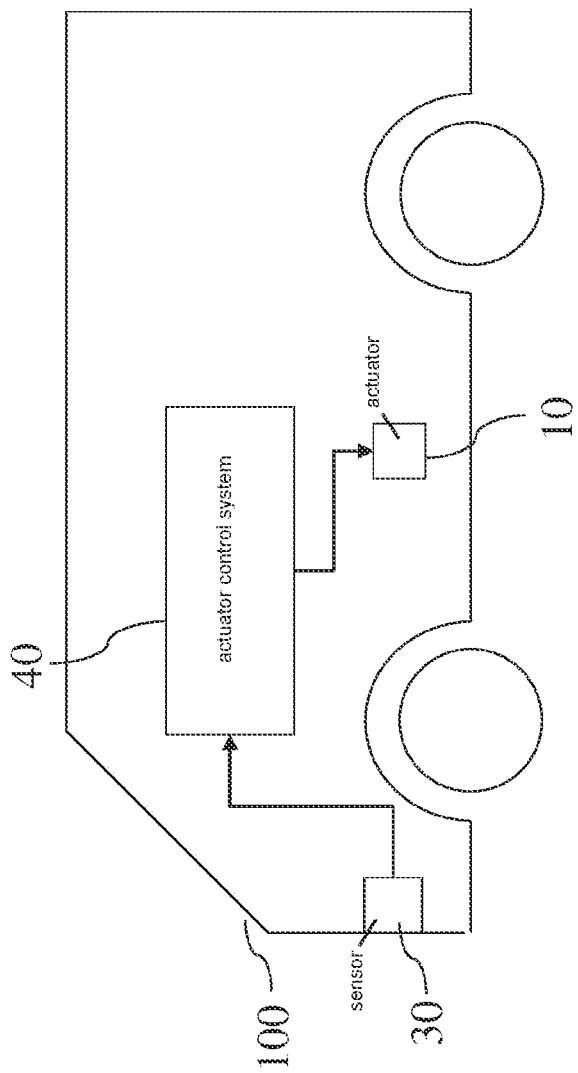
FIG. 2 shows the actuator control system controlling an at least partially autonomous robot, in accordance with an example embodiment of the present invention.

FIG. 2 shows an embodiment in which actuator control system 40 is used to control an at least partially autonomous robot, e.g., an at least partially autonomous vehicle 100.

Sensor 30 may comprise one or more video sensors and/or one or more radar sensors and/or one or more ultrasonic sensors and/or one or more LiDAR sensors and or one or more position sensors (like, e.g., GPS). Some or all of these sensors are preferably but not necessarily integrated in vehicle 100.

Alternatively or additionally sensor 30 may comprise an information system for determining a state of the actuator system. One example for such an information system is a weather information system which determines a present or future state of the weather in environment 20.

For example, using input signal x, the machine learning system 60 may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator 10, which is preferably integrated in vehicle 100, may be given by a brake, a propulsion system, an engine, a drivetrain, or a steering of vehicle 100. Actuator control commands A may be determined such that actuator (or actuators) 10 is/are controlled such that vehicle 100 avoids collisions with said detected objects. Detected objects may also be classified according to what they machine learning system 60 deems them most likely to be, e.g., pedestrians or trees, and actuator control commands A may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses sensor 30, preferably an optical sensor, to determine a state of plants in the environment 20. Actuator 10 may be a nozzle for spraying chemicals. Depending on an identified species and/or an identified state of the plants, an actuator control command A may be determined to cause actuator 10 to spray the plants with a suitable quantity of suitable chemicals.

In even further embodiments, the at least partially autonomous robot may be given by a domestic appliance (not shown), like, e.g., a washing machine, a stove, an oven, a microwave, or a dishwasher. Sensor 30, e.g., an optical sensor, may detect a state of an object which is to undergo processing by the household appliance. For example, in the case of the domestic appliance being a washing machine, sensor 30 may detect a state of the laundry inside the washing machine. Actuator control signal A may then be determined depending on a detected material of the laundry.

Figure 3:
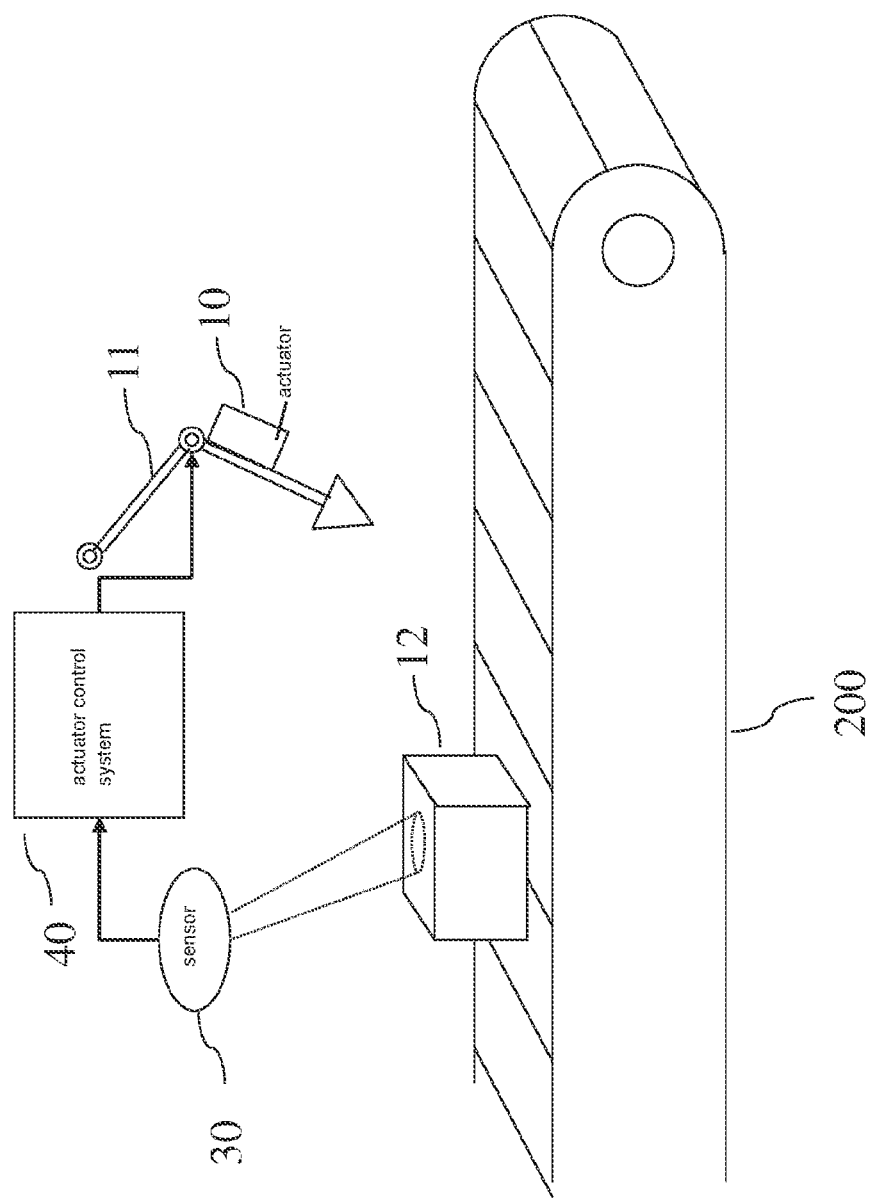
FIG. 3 shows the actuator control system controlling a manufacturing machine, in accordance with an example embodiment of the present invention.

Shown in FIG. 3 is an embodiment in which actuator control system 40 is used to control a manufacturing machine 11, e.g., a punch cutter, a cutter or a gun drill) of a manufacturing system 200, e.g., as part of a production line. The actuator control system 40 controls an actuator 10 which in turn control the manufacturing machine 11.

Sensor 30 may be given by an optical sensor which captures properties of, e.g., a manufactured product 12. Machine learning system 60 may determine a state of the manufactured product 12 from these captured properties. Actuator 10 which controls manufacturing machine 11 may then be controlled depending on the determined state of the manufactured product 12 for a subsequent manufacturing step of manufactured product 12. Or, it may be envisioned that actuator 10 is controlled during manufacturing of a subsequent manufactured product 12 depending on the determined state of the manufactured product 12.

Figure 4:
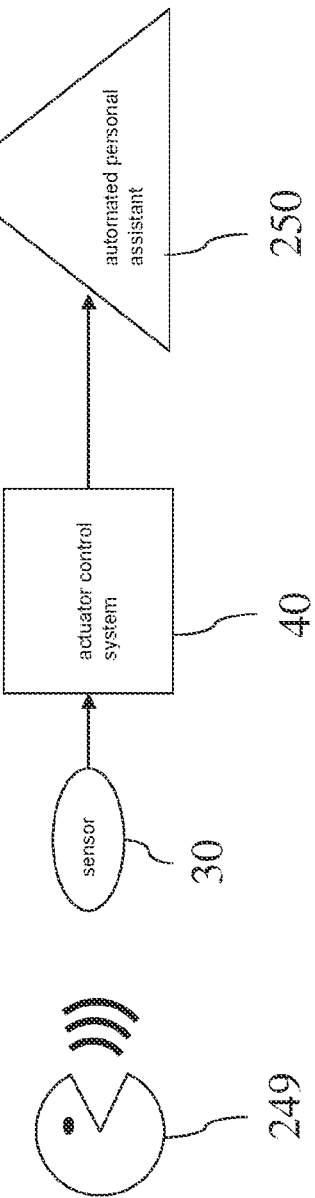
FIG. 4 shows the actuator control system controlling an automated personal assistant, in accordance with an example embodiment of the present invention.

Shown in FIG. 4 is an embodiment in which actuator control system 40 is used for controlling an automated personal assistant 250. In a preferred embodiment, sensor 30 may be an acoustic sensor, which receives voice commands of a human user 249. Sensor 30 may also comprise an optic sensor, e.g., for receiving video images of a gestures of user 249.

Actuator control system 40 then determines actuator control commands A for controlling the automated personal assistant 250. The actuator control commands A are determined in accordance with sensor signal S of sensor 30. Sensor signal S is transmitted to the actuator control system 40. For example, machine learning system 60 may be configured to, e.g., carry out a gesture recognition algorithm to identify a gesture made by user 249, or it may be configured to carry out a voice command recognition algorithm to identify a spoken command uttered by user 249. Actuator control system 40 may then determine an actuator control command A for transmission to the automated personal assistant 250. It then transmits said actuator control command A to the automated personal assistant 250.

For example, actuator control command A may be determined in accordance with the identified user gesture or the identified user voice command recognized by machine learning system 60. It may then comprise information that causes the automated personal assistant 250 to retrieve information from a database and output this retrieved information in a form suitable for reception by user 249.

In further embodiments, it may be envisioned that instead of the automated personal assistant 250, actuator control system 40 controls a domestic appliance (not shown) controlled in accordance with the identified user gesture or the identified user voice command. The domestic appliance may be a washing machine, a stove, an oven, a microwave or a dishwasher.

Figure 5:
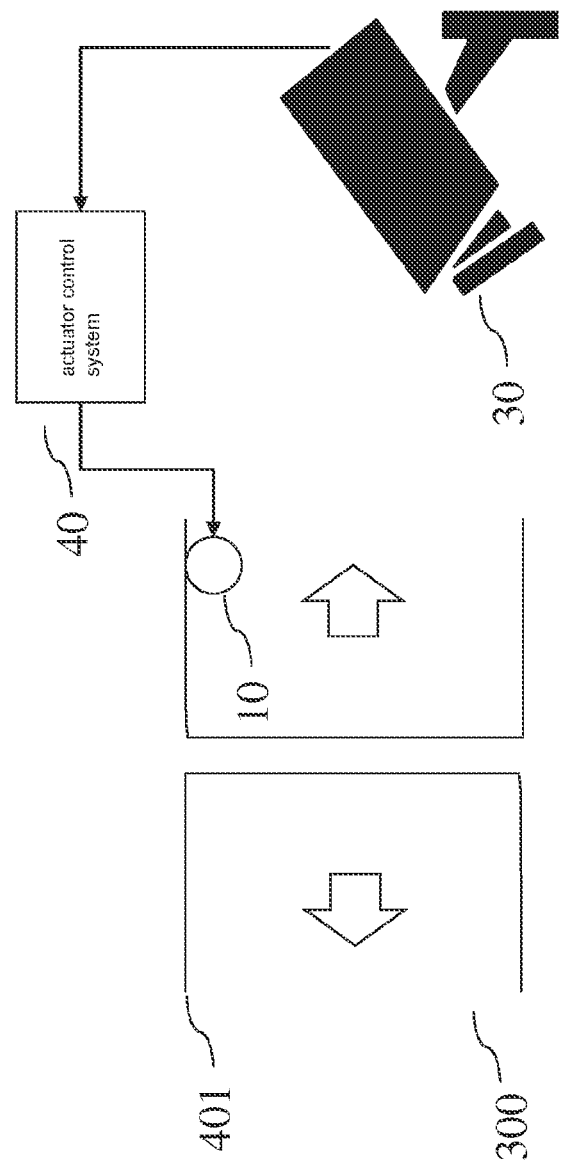
FIG. 5 shows the actuator control system controlling; an access control system, in accordance with an example embodiment of the present invention.

Shown in FIG. 5 is an embodiment in which actuator control system controls an access control system 300. Access control system may be designed to physically control access. It may, for example, comprise a door 401. Sensor 30 is configured to detect a scene that is relevant for deciding whether access is to be granted or not. It may for example be an optical sensor for providing image or video data, for detecting a person's face. Machine learning system 60 may be configured to interpret this image or video data, e.g., by matching identities with known people stored in a database, thereby determining an identity of the person. Actuator control signal A may then be determined depending on the interpretation of machine learning system 60, e.g., in accordance with the determined identity. Actuator 10 may be a lock which grants access or not depending on actuator control signal A. A non-physical, logical access control is also possible.

Figure 6:
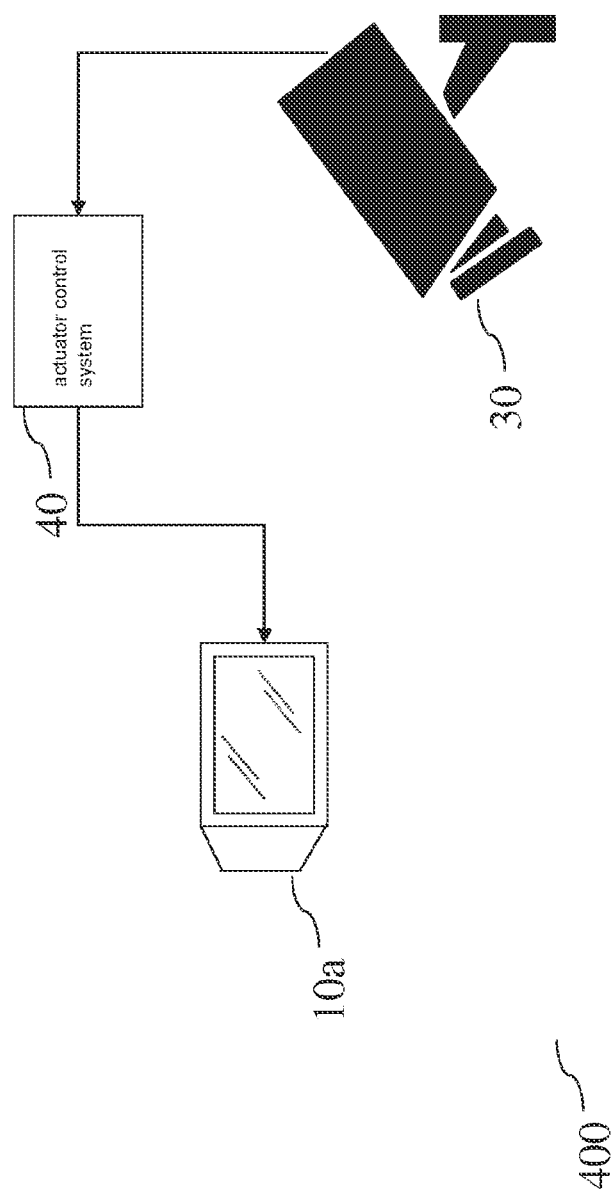
FIG. 6 shows the actuator control system controlling a surveillance system, in accordance with an example embodiment of the present invention.

Shown in FIG. 6 is an embodiment in which actuator control system 40 controls a surveillance system 400. This embodiment is largely identical to the embodiment shown in FIG. 5. Therefore, only the differing aspects will be described in detail. Sensor 30 is configured to detect a scene that is under surveillance. Actuator control system does not necessarily control an actuator 10, but a display 10a. For example, the machine learning system 60 may determine whether a scene detected by optical sensor 30 is suspicious. Actuator control signal A which is transmitted to display 10a may then, e.g., be configured to cause display 10a to highlight an object that is deemed suspicious by machine learning system 60.

Figure 7:
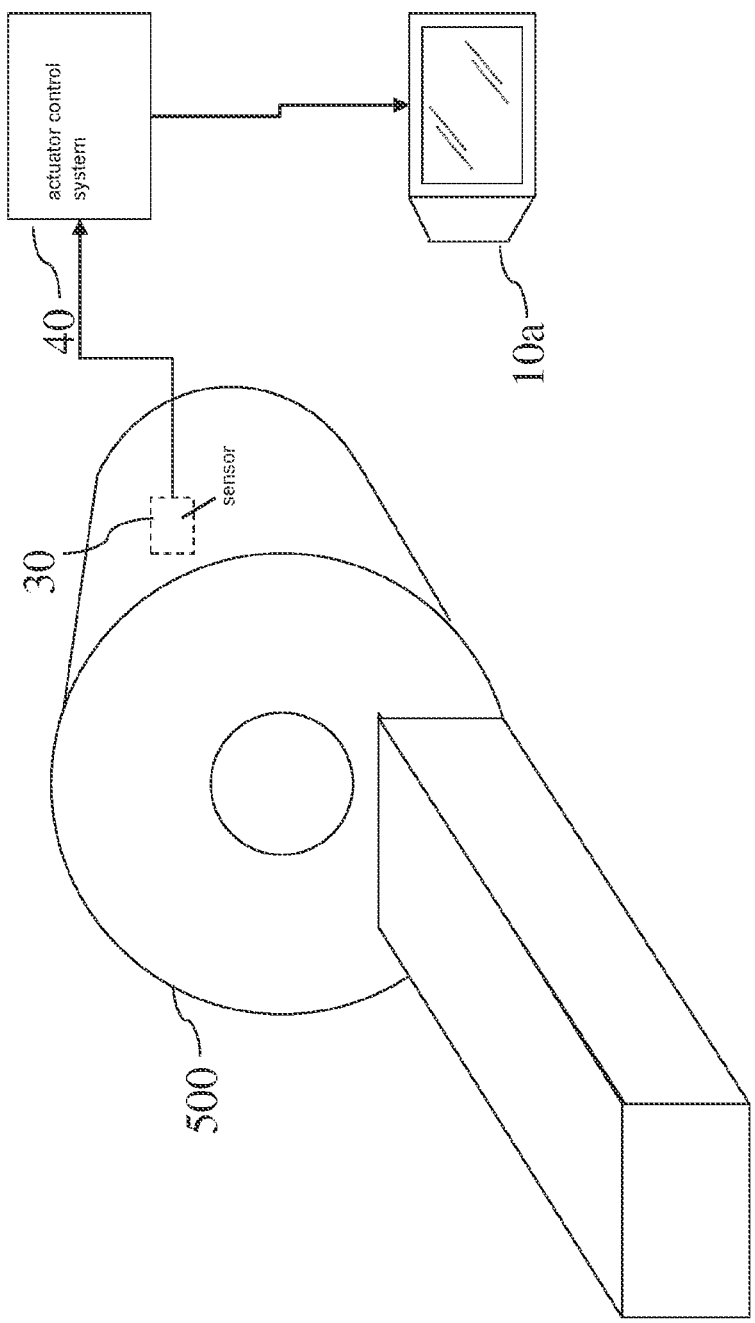
FIG. 7 shows the actuator control system controlling an imaging system, in accordance with an example embodiment of the present invention.

Shown in FIG. 7 is an embodiment of an actuator control system 40 for controlling an imaging system 500, for example an MRI apparatus, x-ray imaging apparatus or ultrasonic imaging apparatus. Sensor 30 may, for example, be an imaging sensor, the sensed image of which is interpreted by machine learning system 60. Actuator control signal A may then be chosen in accordance with this interpretation, thereby controlling display 10a. For example, machine learning system 60 may interpret a region of the sensed image to be potentially anomalous. In this case, actuator control signal A may be determined to cause display 10a to display the imaging and highlighting the potentially anomalous region.

Figure 8:
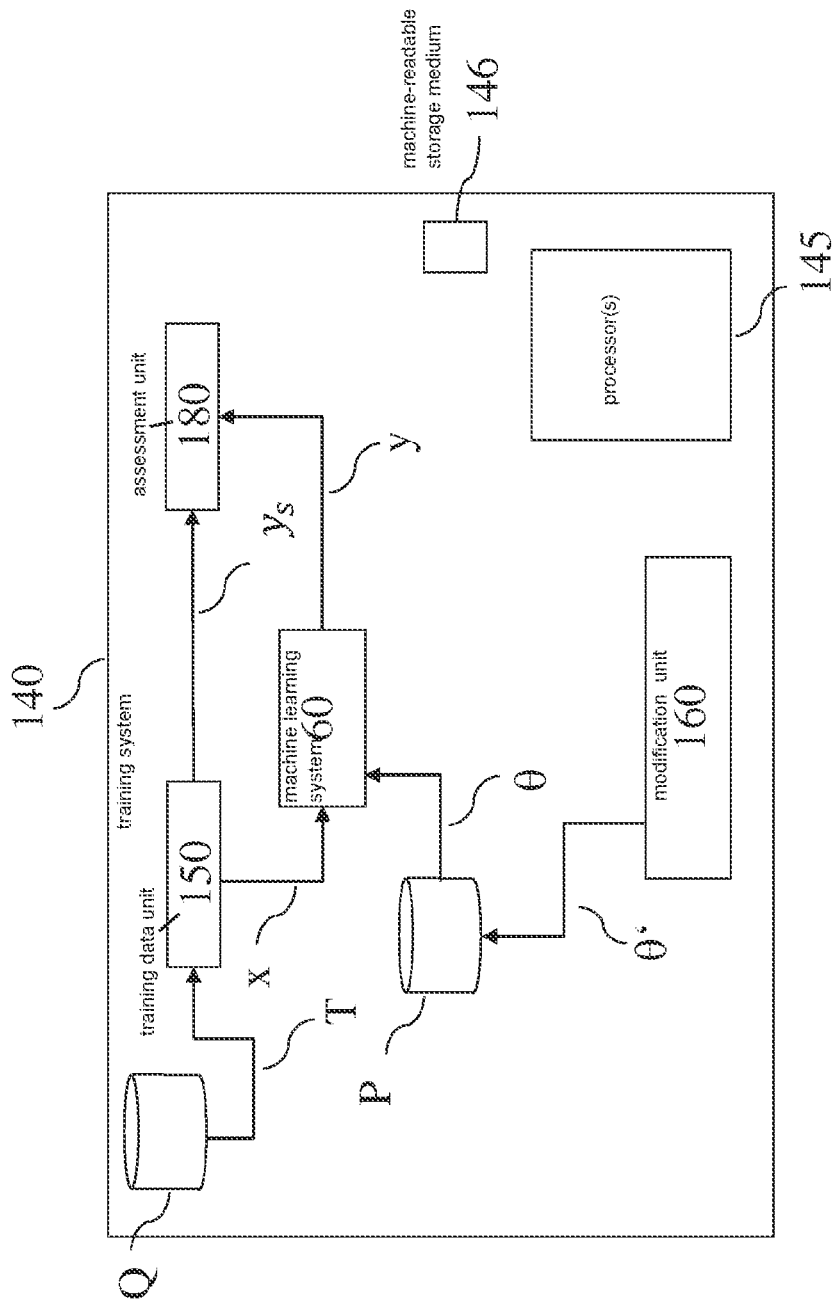
FIG. 8 shows a trainings system for controlling the machine learning system, in accordance with an example embodiment of the present invention.

Shown in FIG. 8 is an embodiment of a training system 140 for training machine learning system 60. A training data unit 150 determines input signals x, which are passed on to machine learning system 60. For example, training data unit 150 may access a computer implemented database Q in which a set T of training data is stored. Set T comprises pairs of input signal x and corresponding desired output signal $y_s$. Training data unit 150 selects samples from set T, e.g., randomly. Input signal x of a selected sample is passed on to machine learning system 60. Desired output signal $y_s$ is passed on to assessment unit 180.

Machine learning system 60 is configured to compute output signals y from input signals x. These output signals x are also passed on to assessment unit 180.

A modification unit 160 determines updated parameters θ' depending on input from assessment unit 180. Updated parameters θ' are transmitted to parameter storage P to replace present parameters θ.

For example, it may be envisioned that assessment unit 180 determines the value of a loss function £ depending on output signals y and desired output signals $y_s$. Modification unit 160 may then compute updated parameters θ' using, e.g., stochastic gradient descent to optimize the loss function L.

Furthermore, training system 140 may comprise a processor 145 (or a plurality of processors) and at least one machine-readable storage medium 146 on which instructions are stored which, if carried out, cause actuator control system 140 to carry out a method according to one aspect of the present invention.

Figure 9:
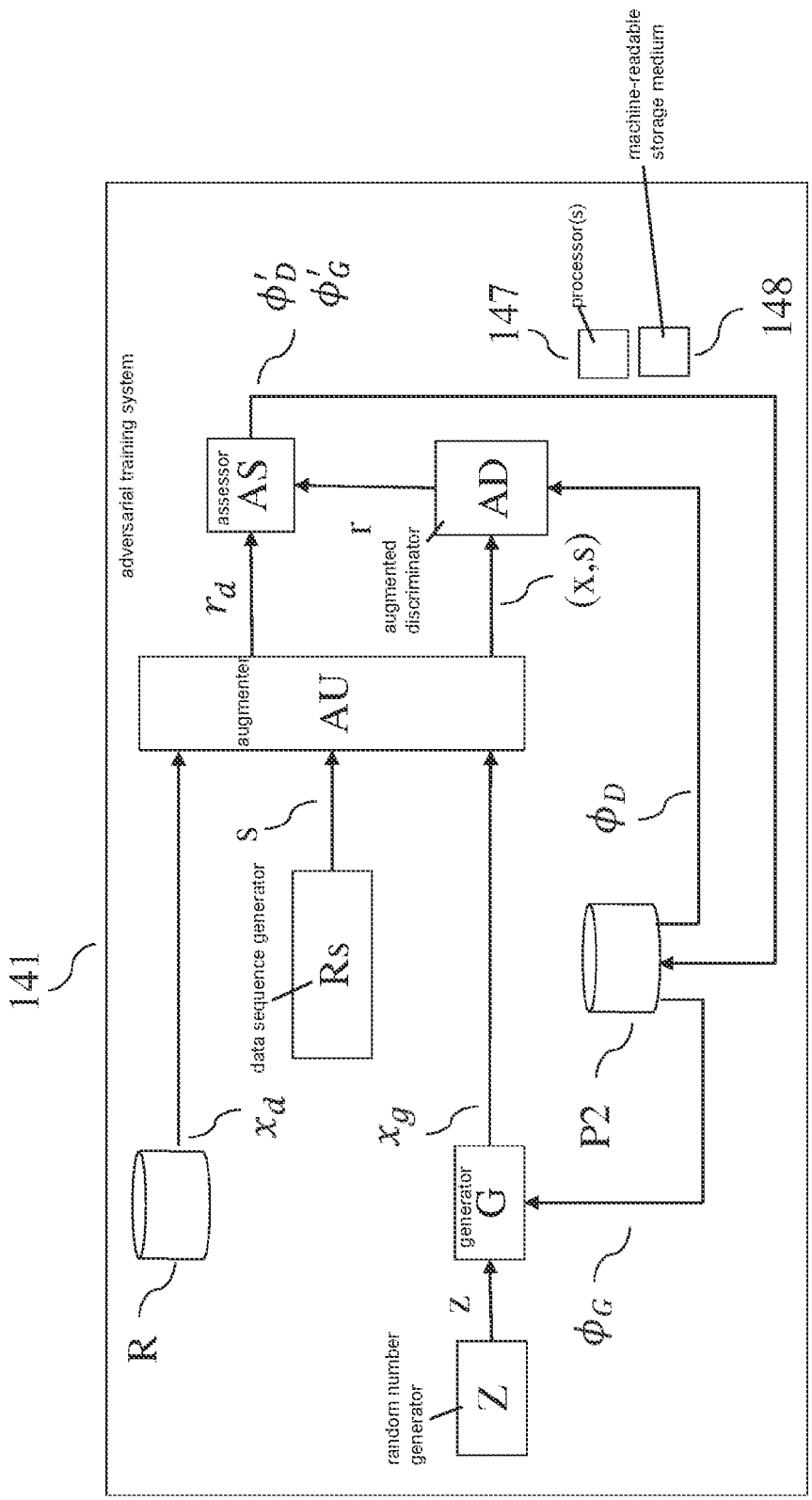
FIG. 9 shows an adversarial training system for training an augmented discriminator and a generator, in accordance with an example embodiment of the present invention.

Shown in FIG. 9 is an adversarial training system 141 for training an augmented discriminator AD and a generator G. Real training samples $x_d$ are stored in a real training sample database R and transmitted to an augmenter AU.

A random number generator Z generates a random number z sampled from a predefined distribution P(z). It is well understood that a computer-generated random number may be a pseudorandom number. This understanding shall be implicitly assumed throughout this disclosure.

Methods for generating random numbers according to a predefined distribution are well understood by the person having ordinary skill in the art. For example, if the predefined distribution P (z) is a Gaussian distribution, the random (or pseudorandom) number z may be obtained from a uniformly distributed random number by using the conventional Box-Muller transform. The random number z is passed on to generator G. Generator G may be defined as a function that is parametrized by generator parameters $\phi_G$ and transforms the number z at its input into an artificial training sample $x_g$. The artificial training sample $x_g$ is passed on to augmentor AU.

Generator G may, for example, be given by an artificial neural network that is ideally dimensioned such that artificial training sample $x_g$ and real training sample $x_d$ have the same dimensions.

A data sequence generator $R_s$ generates a data sequence s. Data sequence s may be a stream of bits. For example, data sequence generator $R_s$ may be a random number generator producing uniformly distributed random numbers. This generated data sequence s is also passed on to augmenter AU.

Generator parameters $\phi_G$ are stored in and supplied to generator G by a second parameter storage P2. The generated artificial training sample $x_g$ is passed on to augmenter AU.

Augmenter AU generates a training sample x by selecting either real training sample $x_d$ or artificial training sample $x_g$ as training sample x, and passes the pair of generated training sample x and data sequence s on to augmented discriminator AD. Also, augmenter AU computes a desired result $r_d$ of augmented discriminator AD from data sequence s and its choice for real training sample x (i.e., whether it selected real training sample $x_d$ or artificial training sample $x_g$ as training sample x). Said desired result $r_d$ is passed on to an assessor AS.

Augmented discriminator AD comprises a mathematical function, e.g., an artificial neural network, which is parametrized by discriminator parameters $\phi_D$. Discriminator parameters $\phi_D$ are stored in second parameter storage P2 and provided to augmented discriminator AD. Using this mathematical function, augmented discriminator AD computes a result r depending on training sample x and data sequence s. Result r is passed on to assessor AS.

Depending on received result r and received desired result $r_d$, assessor AS computes new discriminator parameters $\phi'_D$ and/or new generator parameters $\phi'_G$ and transmit them to second parameter storage P2 to replace existing discriminator parameters $\phi'_D$ and/or generator parameters $\phi'_G$.

Furthermore, adversarial training system 141 may comprise a processor 147 (or a plurality of processors) and at least one machine-readable storage medium 148 on which instructions are stored which, if carried out, cause adversarial training system 141 to carry out a method according to one aspect of the present invention.

Figure 10:
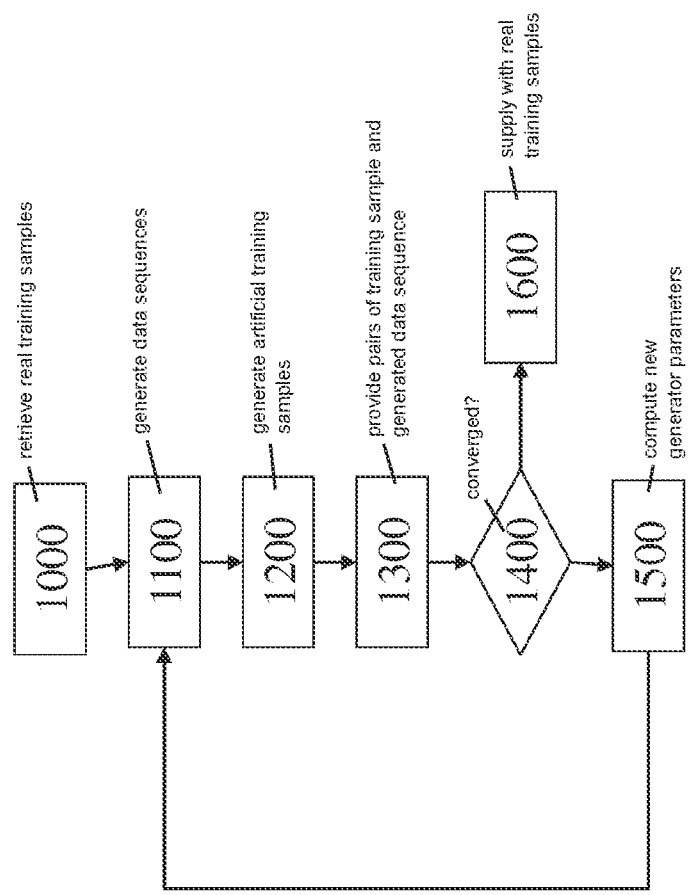
FIG. 10 shows a flow-chart diagram of a training method carried out by said adversarial training system, in accordance with an example embodiment of the present invention.

Shown in FIG. 10 is a flow-chart diagram that illustrates an embodiment of a method for training generator G and augmented discriminator AD that may be carried out by adversarial training system 141.

First (1000), real training samples $x_d$ are retrieved from training sample database R.

Then (1100), data sequence generator $R_s$ generates a predefined number of data sequences s per retrieved real training sample $x_d$. Preferably, This predefined number is the same for all retrieved real training samples $x_d$. This number is larger than one, although one generated data sequence s per retrieved real training sample $x_d$ is also an option. In a preferred embodiment, the retrieval operation in step (1000) includes the possibility that real training samples $x_d$ are drawn from the set of all training samples multiple times. Then, for each drawn training sample $x_d$, one corresponding data sequence s is generated. If the same training sample $x_d$ is drawn again, a new corresponding data sequence s is generated (which may be the same as the first one, but likely is not).

The length of the generated data sequence s may be of predefined length. This predefined length may be fixed over all iterations. However, in another embodiment, it may increase on-the-fly, depending on the progress of training of the augmented discriminator D (see below in step (1300)).

The real training samples $x_d$ are then augmented, i.e., for each real training sample $x_d$ and for each generated data sequence s, a pair ($x_d$/s) of real training sample $x_d$ and generated data sequence s is provided. If the predefined number is larger than one, there are more pairs than real training samples $x_d$.

Also, augmenter AU computes desired results $r_d$ preferably as corresponding to either one of the logical values TRUE or FALSE. In a preferred embodiment, $r_d$ is TRUE if a checksum (i.e., the sum of the values of its bits) of data sequence s is even, and FALSE if it is odd.

In the next step (1200), generator G generates artificial training samples $x_g$. Like for real training samples $x_d$, data sequence generator $R_s$ generates a predefined number of data sequences s per generated artificial training sample $x_g$.

The artificial training samples $x_g$ are then augmented, i.e., for each for artificial training samples $x_g$, and for each generated data sequence s, a pair ($x_g$/s) of artificial training sample $x_g$ and generated data sequence s is provided. If the predefined number is larger than one, there are more pairs than artificial training samples $x_g$.

Also, augmenter AU computes desired results $r_d$. In the above preferred embodiment, $r_d$ is TRUE if a checksum (i.e., the sum of the values of its bits) of data sequence s is odd, and FALSE if it is even.

Then (1300), the augmented discriminator AD is provided with pairs (x, s) of training sample x and generated data sequence s, the pair (x, s) either being a pair ($x_d$, s) of real training sample $x_d$ and generated data sequence s provided in step (1100), or a pair ($x_d$, s) of real training sample $x_d$ and generated data sequence s provided in step (1200). Augmented discriminator AD then computes result r. Assessor AS receives result r obtained from pair (x, s) and the corresponding desired result $r_d$. New discriminator parameters $\phi'_D$ are then computed (and stored in second parameter storage P2) such that a loss function that punishes if results r and desired results $r_d$ do not match is minimized, e.g., by stochastic gradient descent.

Optionally, depending on the value of the loss function, the predefined length with which generated data sequences s are generated may be increased for all subsequent runs if the performance of the augmented discriminator AD is better than a threshold level.

Figure 11:
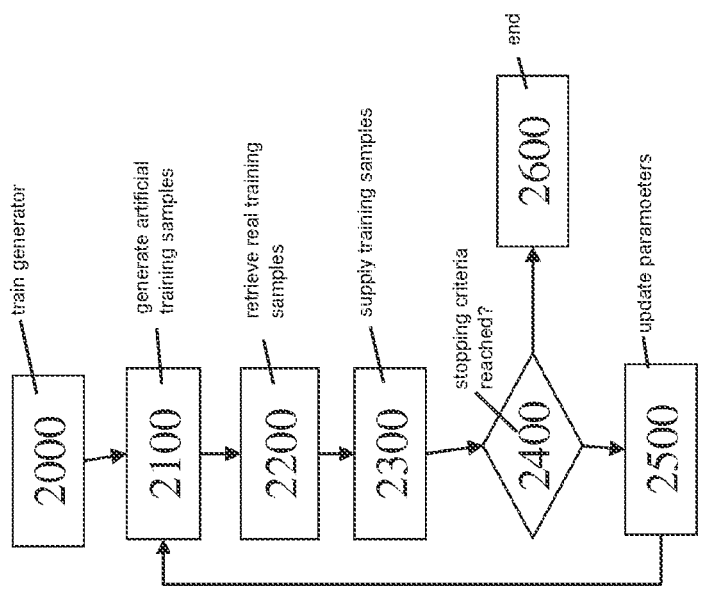
FIG. 11 shows a flow-chart diagram illustrating a training method carried out by the training system shown in FIG. 12, in accordance with an example embodiment of the present invention.

Next (1400), it is checked whether the training procedure of generator G has converged. If it has not, then (1500) new generator parameters $\phi'_G$ are computed (and stored in second parameter storage P2) such that the above loss function is maximized, e.g., by stochastic gradient ascent. The method then iterates back to step (1100). If it has, then (1600), in an optional step, a discriminator D that is supplied with either real training samples $x_d$ or artificial training samples $x_g$ may be trained to distinguish whether a data sample that it has been supplied with is a real training sample $x_d$ or an artificial training samples $x_g$. One possible embodiment of this method is illustrated in FIG. 11. This concludes this method.

In an alternative example embodiment of the method, each generated data sequence s may be associated with one augmented discriminator each. These may all be trained as ensemble of discriminators, in which, each realization of the generated data sequence s leads to a different discriminator. New generator parameters $\phi'_G$ may be updated by computing an averaged loss (i.e., averaged over all or some of the discriminators in the ensemble), or by updated by taking the most popular result among the discriminators in the ensemble.

Figure 12:
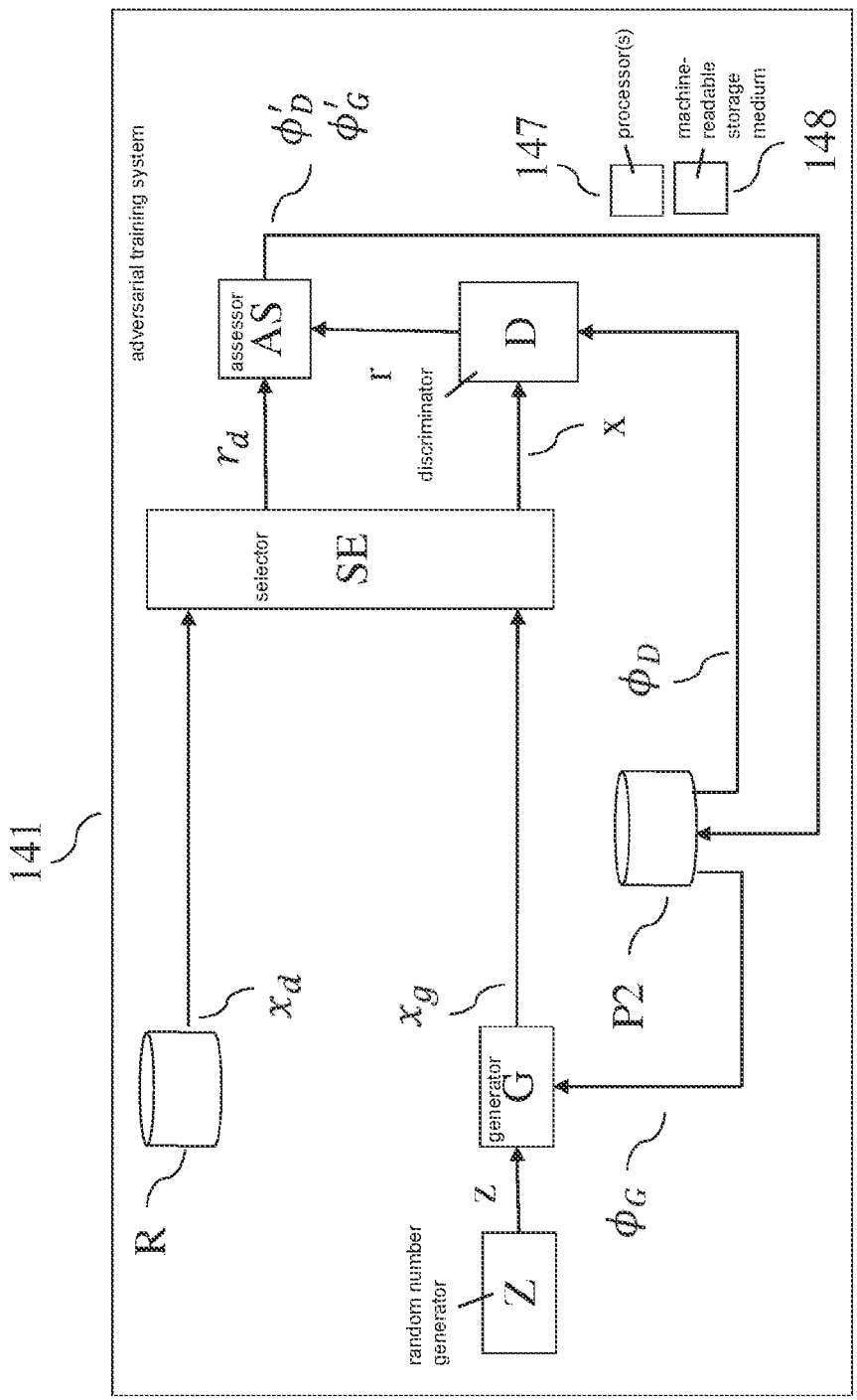
FIG. 12 shows a training system for training a discriminator D, in accordance with an example embodiment of the present invention.

Shown in FIG. 11 is a flow-chart diagram that illustrates an embodiment of a method for training the discriminator D as outlined in step (1600) of FIG. 10. An embodiment of a training system 141 for training the discriminator D is shown in FIG. 12. It is largely identical with the adversarial training system shown in FIG. 9. Therefore, only the differences will be highlighted. Instead of the augmented discriminator AD, the system trains discriminator D. Instead of an augmenter AU, a selector SE is used, which receives real training samples $x_d$ and artificial training samples $x_g$. However, no data sequence generator $R_s$ is needed, nor are data sequences s. Other than the augmenter AU, selector SE merely chooses either real training sample $x_d$ or artificial training sample $x_g$ and passes it on to discriminator D as training sample x. The result r computed by discriminator D indicates whether discriminator D judges received training sample x to be real training sample $x_d$, or artificial training sample $x_g$. Accordingly, desired result $r_d$ indicates whether training sample x actually is be real training sample $x_d$, or artificial training sample $x_g$.

The method illustrated in FIG. 11 starts (2000) with the generator G being trained with the method as illustrated in FIG. 10, especially by steps (1100)-(1500).

Then (2100), this pre-trained generator G generates artificial training samples $x_g$. Furthermore (2200), real training samples $x_d$ are retrieved from training sample database R.

Now (2300), discriminator D is supplied with training samples x that are taken from either the generated artificial training samples $x_g$ or the retrieved real training samples $x_d$. For each training sample, discriminator D then computes result r which indicates whether training sample x actually is real training sample $x_d$, or artificial training sample $x_g$. Depending on these training samples x, discriminator D generates results r. Based on results r and desired results $r_d$, parameters $\phi_D$ characterizing discriminator D are updated to new parameters $\phi'_D$ according to the inner maximization of equation (1).

Optionally, it may now (2400) be determined whether a stopping criterion has been reached. If this is not the case (2500), parameters $\phi_G$ characterizing generator G are updated to new parameters $\phi'_G$ according to equation (1), and the method iterates back to (2100). If it is determined that the stopping criterion has been reached, the method ends (2600).

Trained discriminator D may be used in a straightforward way as part of machine learning system 60 by receiving input signal x and determining whether this input signal x appears to be real or artificial in nature. For example, if generator G is configured to generate a signals containing a specific trait during training, and if this trait is not present in the real training data, discriminator D that has been trained in a GAN-setup with generator G as exemplified in the algorithm shown in FIG. 11 will be trained to detect whether this specific trait is present in the input signal x, or not. For example, discriminator D may be trained to detect whether input signal x has been modified by an intruder to the system, or not. Output signal y may then be chosen in accordance with whether this specific trait has been detected, or not.

Figure 13:
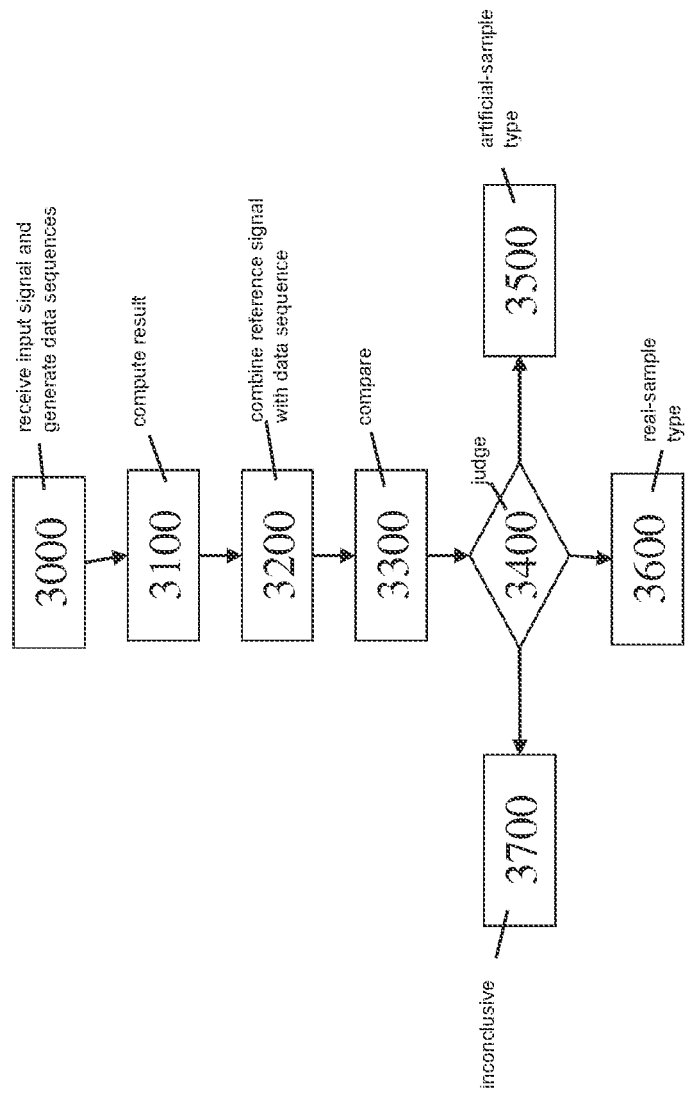
FIG. 13 shows a flow-chart diagram illustrating a method for using the trained augmented discriminator, in accordance with an example embodiment of the present invention.

FIG. 13 shows an example embodiment of a method that uses the trained augmented discriminator AD as part of machine learning system 60 for the same purpose.

First (3000), machine learning system 60 receives input signal x, for example an image. Data sequences s, preferably a plurality of data sequences s, are created for each received input signal x. This may be achieved by, e.g., using the data sequence generator $R_s$ shown in FIG. 9.

Then (3100), for each pair (x, s) of input signal x and data sequence s, augmented discriminator AD computes the result r.

Then (3200), for each of the above pairs (x, s) a reference signal $x_t$ which may be generated by generator G is combined with data sequence s and fed to augmented discriminator AD. From this input, augmented discriminator AD computes reference result $r_t$. Alternatively, reference signal $x_t$ may be one of the real training samples $x_d$ taken from real training sample database R.

Then (3300), for each input signal x, it is judged whether augmented discriminator AD classified it as being of real-sample type, or of artificial-sample type. To this end, for each data sequence s result r obtained from augmented discriminator AD is compared to reference result $r_t$. If they are the same, input signal x is judged to be of the same type as reference signal $x_t$ (i.e., of real-sample type if reference signal $x_t$ was taken from real training sample database R and of artificial-sample type if reference signal $x_t$ was generated by generator G). If they are not the same, input signal x is judged to be of the type differing from the type of reference signal $x_t$ (i.e., of artificial-sample type if reference signal $x_t$ was taken from real training sample database R and of real-sample type if reference signal $x_t$ was generated by generator G).

In case a plurality of data sequences s has been generated, judgment whether input signal x is of real-sample type or artificial-sample type may be made by a majority vote using all data sequences s. Optionally, if there is not a sufficiently clear majority (e.g., if judgment is in disagreement with the majority judgment for more than a predefined proportion, e.g., 30% of all data sequences s), the judgment may be judged to be inconclusive.

Finally (3400), based on the above judgment on input signal x, different actions may be taken. If input signal x is judged to be of artificial-sample type (3500), output signal y and correspondingly actuator control signal A may be chosen such that operation of actuator A is transferred to a safe mode. If input signal x is judged to be of real-sample type (3600), output signal y may be chosen such that operating mode of actuator A is maintained, i.e., if it is presently operated in a normal mode, operation in normal mode will persist. If is presently operated in safe mode, operation in safe mode will persist. If judgment on input signal x is inconclusive (3700), that input signal x may be ignored for operation and, e.g., output signal y may be copied from a previous time step.

Figure 14:
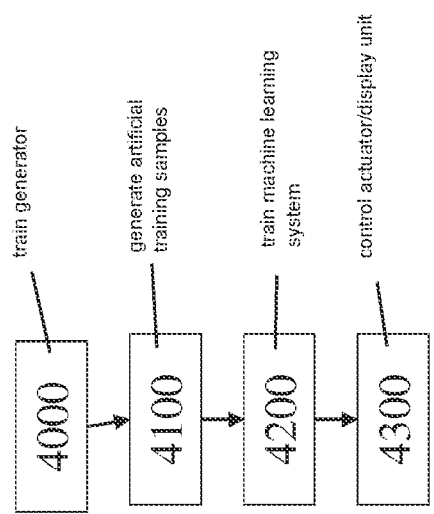
FIG. 14 shows a flow-chart diagram illustrating a method that uses trained generator G, in accordance with an example embodiment of the present invention.
Figure 15:
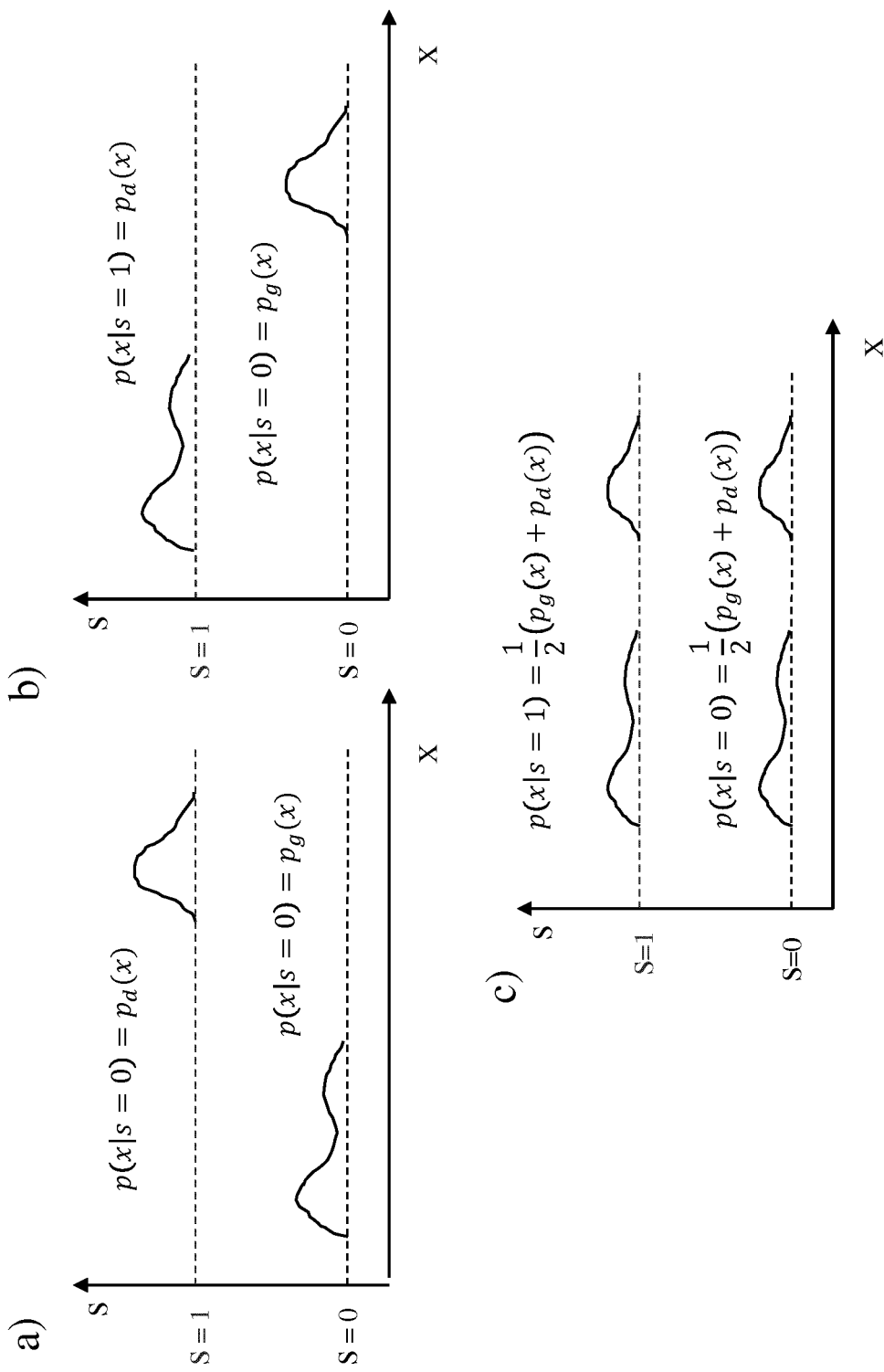
FIGS. 15a)-c) show probability distributions that illustrate how the present invention works in accordance with an example embodiment.

Shown in FIG. 14 is a flow-chart diagram that illustrates one embodiment of a method in which generator G is used to train machine learning system 60 which may or may not be part of actuator control system 40.

First (4000), generator G is trained with the method illustrated in FIG. 10. Then (4100), generator G is used to generate a set of artificial training samples x.

Corresponding desired output signals $y_s$ are generated with a suitable method. For example, artificial training samples x may be presented to a human expert, and corresponding output signal $y_s$ input by said human expert may be received.

(Alternatively, instead of having all artificial training samples x labelled by a human expert, generator G may have been trained to also generate desired output signals $y_s$ together with the artificial training sample x. Then, generator G may be used to generate the desired output signal $y_s$. To train generator G in such a way, it is possible to start from a few labelled training data samples (which have been, for example, labelled by a human expert) and train G as described above in FIGS. 9 and 10, with the difference that training samples x would have to be replaced by pairs (x, $y_s$) of training samples x and corresponding output signal $y_s$ throughout).

The pairs (x, $y_s$) of artificial training samples x and corresponding output signal $y_s$ may be added to set T of training data and stored in computer-implemented database Q. Machine learning system 60 may then be trained (4200) using training system 140. Actuator control system 40 may then control (4300) actuator 10 and/or display unit 10a depending on output signal y generated by machine learning system 60. This concludes the method.

The invention claimed is:

1. A computer-implemented method comprising:
training an augmented discriminator and a generator, wherein the trained augmented discriminator is used for classifying whether an input signal provided to a machine learning system is more similar to real training examples samples or to artificial training samples, the training being performed by:
providing a training set including the real training samples and the artificial training samples, wherein the artificial training samples are generated by the generator;
assigning a respective data sequence to each respective data sample of the training set;
assigning each pair of respective data sample and assigned respective data sequence to one class of a plurality of classes such that, the assigned one class of the plurality of classes and the assigned data sequence taken together characterize whether the respective data sample is one of the real training samples or one of the artificial training samples;
training the augmented discriminator to be able to compute, for each of the pairs of respective data sample and assigned respective data sequence, the respective one class to which the pair is assigned; and
training the generator to be able to generate artificial training samples such that the augmented discriminator is not able to correctly compute the one class;
generating an actuator control signal, by an actuator control system, depending on an output signal of a machine learning system, the output signal being generated depending on which class the input signal has been classified;
providing a pair of the input signal and a generated data sequence to the augmented discriminator so that the trained augmented discriminator outputs a result;
providing a reference signal of which it known whether it is more similar to the real training examples samples or to the artificial training samples;
providing a reference pair of the reference signal and the generated data sequence to the trained augmented discriminator so that the trained augmented discriminator outputs a reference result; and
determining whether the input signal is more similar to the real training examples samples or to the artificial training samples depending on a comparison between the result and the reference result.

2. The method according to claim 1, wherein each respective data sequence is chosen randomly.

3. The method according to claim 1, wherein each respective data sequence has a predefined length, and the predefined length is increased during the training depending on a progress of a performance of the augmented discriminator during the training.

4. The method according to claim 1, wherein a plurality of data sequences is assigned to each data sample of the training set to generate a corresponding plurality of pairs of data sample and assigned data sequences.

5. The method according to claim 1, wherein each respective data sequence is assigned to either one of two classes, and the class to which each pair of respective data sample and assigned respective data sequence is assigned is determined depending on whether the data respective sample is a real training sample or an artificial training sample and depending on the one class to which the data sequence has been assigned.

6. The method according to claim 5, wherein for a given class to which each data sequence has been assigned, the class to which the pair of respective data sample and assigned respective data sequence is assigned is different depending on whether the data sample is a real training sample or an artificial training sample.

7. The method according to claim 5, in which the class to which each respective data sequence is assigned depends on every bit of the respective data sequence.

8. The method according to claim 5, in which a number of data sequences that are assigned to each class is the same for all classes.

9. The method according to claim 5, wherein each respective data sequence is assigned to a class depending on a checksum of the respective data sequence.

10. The method according to claim 1, further comprising: using the generator to generate training samples for training the machine learning system for outputting the output signal.

11. The method according to claim 10, further comprising training the machine learning system to output the output signal, wherein training of the machine-learning system is performed with the training samples generated using the generator.

12. The method according to claim 1, further comprising: controlling the actuator using the actuator control signal.

13. The method according to claim 12, wherein the actuator controls an at least partially autonomous robot and/or a manufacturing machine and/or an automated personal assistant and/or an access control system.

14. The method according to claim 1, further comprising: controlling a display of a surveillance system using the actuator control signal, wherein the input signal is provided in accordance with a sensor signal of a sensor that detects a scene which is under surveillance; or controlling a display of an imaging system using the actuator control signal, wherein the input signal is provided in accordance with a sensor signal of an imaging sensor of the imaging system.

15. A computer-implemented method comprising: training a discriminator to be able to distinguish to which one of two predefinable classes a data sample provided to the discriminator belongs, wherein the discriminator is used for classifying whether an input signal provided to a machine learning system is more similar to real training examples samples or to artificial training samples, the training being performed by:
training a generator by:
providing a training set including the real training samples and the artificial training samples, wherein the artificial training samples are generated by the generator;
assigning a respective data sequence to each respective data sample of the training set;
assigning each pair of respective data sample and assigned respective data sequence to one class of a plurality of classes such that, the assigned one class of the plurality of classes and the assigned data sequence taken together characterize whether the respective data sample is a real training sample or an artificial training sample;
training the augmented discriminator to being able to compute, for each of the pairs of respective data sample and assigned respective data sequence, the respective one class to which the pair is assigned; and
training the generator to being able to generate artificial training samples such that the augmented discriminator is not able to correctly compute the one class;
providing a second training set including further real training samples and further artificial training samples generated by the trained generator; and
training the discriminator to being able to distinguish whether a data sample is a real training sample or an artificial training sample using the second training set;
generating an actuator control signal by an actuator control system depending on an output signal of the machine learning system which includes the discriminator, the output signal being generated depending on which class the input signal has been classified;
providing the input signal to the discriminator so that the discriminator outputs a result; and
determining whether the input signal is more similar to the real training examples samples or to the artificial training samples, depending on the result.

16. A non-transitory machine-readable storage medium on which is stored a computer program that is executable by a computer and that, when executed by the computer, causes the computer to perform a method, the method comprising:
training an augmented discriminator and a generator, wherein the trained augmented discriminator is used for classifying whether an input signal provided to a machine learning system is more similar to real training examples samples or to artificial training samples, the training being performed by:
providing a training set including the real training samples and the artificial training samples, wherein the artificial training samples are generated by the generator;
assigning a respective data sequence to each respective data sample of the training set;
assigning each pair of respective data sample and assigned respective data sequence to one class of a plurality of classes such that, the assigned one class of the plurality of classes and the assigned data sequence taken together characterize whether the respective data sample is a real training sample or an artificial training sample;
training the augmented discriminator to being able to compute, for each of the pairs of respective data sample and assigned respective data sequence, the respective one class to which the pair is assigned; and training the generator to be able to generate artificial training samples such that the augmented discriminator is not able to correctly compute the one class;

generating an actuator control signal, by an actuator control system, depending on an output signal of a machine learning system, the output signal being generated depending on which class the input signal has been classified;

providing a pair of the input signal and a generated data sequence to the augmented discriminator so that the trained augmented discriminator outputs a result;

providing a reference signal of which it known whether it is more similar to the real training examples samples or to the artificial training samples;

providing a reference pair of the reference signal and the generated data sequence to the trained augmented discriminator so that the trained augmented discriminator outputs a reference result; and determining whether the input signal is more similar to the real training examples samples or to the artificial training samples depending on a comparison between the result and the reference result.

17. An actuator control system configured to:

use a trained augmented discriminator for classifying whether an input signal provided to a machine learning system is more similar to real training examples samples or to artificial training samples, the augmented discriminator and a generator being trained by:

providing a training set including the real training samples and the artificial training samples, wherein the artificial training samples are generated by the generator;

assigning a respective data sequence to each respective data sample of the training set;

assigning each pair of respective data sample and assigned respective data sequence to one class of a plurality of classes such that, the assigned one class of the plurality of classes and the assigned data sequence taken together characterize whether the respective data sample is one of the real training samples or one of the artificial training samples;

training the augmented discriminator to be able to compute, for each of the pairs of respective data sample and assigned respective data sequence, the respective one class to which the pair is assigned; and training the generator to being able to generate artificial training samples such that the augmented discriminator is not able to correctly compute the one class;

generate an actuator control signal, by an actuator control system, depending on an output signal of the machine learning system, the output signal being generated depending on which class the input signal has been classified;

provide a pair of the input signal and a generated data sequence to the augmented discriminator so that the trained augmented discriminator outputs a result;

provide a reference signal of which it known whether it is more similar to the real training examples samples or to the artificial training samples;

provide a reference pair of the reference signal and the generated data sequence to the trained augmented discriminator so that the trained augmented discriminator outputs a reference result; and determine whether the input signal is more similar to the real training examples samples or to the artificial training samples depending on a comparison between the result and the reference result.

\* \* \* \* \*